(12) United States Patent
Shinoda (10) Patent No.: US 8,077,581 B2
(45) Date of Patent: Dec. 13, 2011

(54) OPTICAL PICKUP AND OPTICAL DISC DRIVE

(75) Inventor: Masahisa Shinoda, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 294 days.

(21) Appl. No.: 12/367,392

(22) Filed: Feb. 6, 2009

(65) Prior Publication Data
US 2009/0201785 A1 Aug. 13, 2009

(30) Foreign Application Priority Data

Feb. 8, 2008 (JP) ................................. 2008-028340
Oct. 6, 2008 (JP) ................................. 2008-259463

(51) Int. Cl.
*G11B 7/00* (2006.01)
(52) U.S. Cl. ............ 369/112.01; 369/44.23; 369/112.02; 369/112.23; 369/112.24
(58) Field of Classification Search ............... 369/44.23, 369/112.01, 112.02, 112.23, 112.24
See application file for complete search history.

(56) References Cited

U.S. PATENT DOCUMENTS

| | | | | |
|---|---|---|---|---|
| 5,381,394 A * | 1/1995 | Yanagawa | ................. | 369/112.24 |
| 5,734,637 A * | 3/1998 | Ootaki et al. | ............ | 369/112.02 |
| 7,037,565 B2 | 5/2006 | Yamaguchi | | |
| 7,126,901 B2 * | 10/2006 | Iwasaki et al. | ............ | 369/112.02 |
| 7,738,344 B2 * | 6/2010 | Ooi et al. | .................. | 369/112.02 |
| 7,782,540 B2 * | 8/2010 | Tanaka et al. | ................. | 359/663 |
| 2004/0081058 A1 * | 4/2004 | Nagatomi et al. | ........ | 369/112.02 |
| 2004/0170107 A1 * | 9/2004 | Iwasaki et al. | ............ | 369/112.02 |
| 2007/0147216 A1 * | 6/2007 | Hirai | ......................... | 369/112.01 |
| 2007/0159936 A1 * | 7/2007 | Iwata et al. | ................. | 369/44.23 |
| 2009/0080319 A1 * | 3/2009 | Koreeda et al. | ........... | 369/112.23 |
| 2009/0116346 A1 * | 5/2009 | Takahashi et al. | .......... | 369/44.23 |
| 2009/0274020 A1 * | 11/2009 | Katayama | .................. | 369/44.23 |
| 2010/0074077 A1 * | 3/2010 | Katayama | .................. | 369/53.12 |

FOREIGN PATENT DOCUMENTS

| | | |
|---|---|---|
| CN | 1478003 A | 2/2004 |
| JP | 2005-339771 A | 12/2005 |
| WO | WO-2008/105285 A1 | 9/2008 |

OTHER PUBLICATIONS

Ichimura et al., O Plus E vol. 27, 4th issue, Apr. 2005, published by New Technology Communications pp. 425 to 430.
Hashizu et al., O Plus E vol., 27, 4th issue, Apr. 2005, published by New Technology Communications pp. 399 to 404.

* cited by examiner

*Primary Examiner* — Wayne Young
*Assistant Examiner* — Brenda Bernardi
(74) *Attorney, Agent, or Firm* — Birch, Stewart, Kolasch & Birch, LLP (57) ABSTRACT

An optical pickup has a semiconductor laser device that can emit laser beams with different wavelengths. A beam splitter and objective lens direct the emitted beam onto a rotating optical disc. Reflected light returns through the objective lens and beam splitter to a photodetector. A pair of liquid crystal elements on the optical path from the optical disc to the photodetector have controllable lens functions acting in different directions to produce an adjustable astigmatic effect that enables the photodetector to generate a focus error signal with a linear range appropriate for the type of optical disc, the number of signal layers in the optical disc, and the spacing between the layers.

17 Claims, 9 Drawing Sheets

| STANDARD | | | CD | DVD | BLUE OPTICAL DISC | |
| --- | --- | --- | --- | --- | --- | --- |
| ITEM | SYMBOL | UNIT | | | HD-DVD | Blu-ray |
| WAVELENGTH | $\lambda$ | $\mu m$ | 0.78 | 0.65 | 0.405 | 0.405 |
| NUMERICAL APARTURE | NA | | 0.45 | 0.60 | 0.65 | 0.85 |
| DEPTH OF FOCUS | $\lambda/(NA)^2$ | $\mu m$ | 3.85 | 1.81 | 0.96 | 0.56 |
| NORMALIZED DEPTH OF FOCUS | | | 1 | 0.47 | 0.25 | 0.15 |

OPTICAL PICKUP AND OPTICAL DISC DRIVE

BACKGROUND OF THE INVENTION

1. Field of the Invention

The present invention relates to an optical pickup and an optical disc drive supporting a plurality of optical disc standards.

2. Description of the Related Art

Optical discs for optically recording and reproducing information are classified into three types, for which laser beams with different center wavelengths are used. The center wavelength is 0.78 micrometer (0.78 μm) for a compact disc (CD), 0.65 μm for a digital versatile disc (DVD), and 0.405 μm for a high-definition DVD (HD-DVD) or a Blu-ray disc (BD). HD-DVDs and BDs are both referred to below as blue optical discs. To provide compatibility with all three types of optical discs, recording and reproducing devices for blue optical discs also need to support the DVD and CD standards. In addition, double-capacity dual-layer discs having two signal layers are available under the DVD and blue optical disc standards, and further research and development that will increase the number of signal layers is currently in progress (see, for example, Ichimura et al., "8-so 200-gigabaito bururei disuku (Eight-layer 200-gigabyte Blu-ray Disc)" *O PLUS E* Vol. 27, 4th issue, April, 2005 published by New Technology Communications pp. 425 to 430, FIG. 9).

As semiconductor laser light sources, semiconductor laser devices capable of generating laser beams with two different wavelengths (0.65 μm and 0.78 μm) from a single chip or package are already commercially available. Semiconductor laser devices capable of generating laser beams with wavelengths of 0.405 μm as well as the above two wavelengths (0.65 μm and 0.78 μm) from a single package are also becoming commercially available (see, for example, Hashizu et al., "Aomurasaki-iro handotai reza (Bluish-purple Semiconductor Laser" *O PLUS E* Vol. 27, 4th issue, April, 2005 published by New Technology Communications pp. 339 to 404, FIGS. 1 and 12).

Turning to the objective lens for focusing the laser beams onto the information recording surface of the optical disc, a single objective lens capable of focusing laser beams with two different wavelengths is used in conventional DVD/CD-compatible optical disc drives. Objective lenses through which laser beams with three different wavelengths, including a blue wavelength, can be focused have also become available.

An optical pickup having a single objective lens and two semiconductor laser packages for generating laser beams of three different wavelengths, and an optical pickup having a single objective lens and a single semiconductor laser package for generating laser beams of three different wavelengths have been proposed (see, for example, Matsumiya et al., Japanese Patent Application Publication No. 2005-339771, pp. 7 and 13, FIGS. 1A, 1B, 2, and 3).

In the optical pickups described by Matsumiya et al., the optical detection system that detects the laser light reflected from the optical disc is also integrated into a single unit. Besides detecting the signal to be reproduced from the optical disc, this optical detection system simultaneously detects signals needed for focusing control and tracking control. Because the specifications of blue optical discs, DVD optical discs, and CD optical discs differ, however, it is extremely difficult to detect the signals required by each of the optical disc specifications with a single optical detection system. In particular, detection of the focus error signal needed for focusing control with a single optical detection system poses problems.

One problem is that a single optical detection system has a single linear range. The linear range is the range over which there is a linear relation between the focus error of the focused laser beam and the focus error signal obtained from the output of the photodetector. With a single linear range, it is difficult to design a control system that provides optimum focus control for three or more types of optical discs.

To explain this problem in more detail, the depth of focus calculated from the wavelength of the light source and the numerical aperture of the objective lens is used as an estimate of the focusing tolerance in focusing control. If the Blu-ray Disc standard (BD standard), which has the highest density among the above standards, is compared with the CD standard, which has the lowest density, the depth of focus in the BD standard is only approximately 1/7 of the depth in the CD standard. The DVD and blue DVD standards standard also include specifications for commercially available dual-layer discs with signal surfaces one above the other, and the research and development work mentioned above has produced announcements from several organizations of the development of discs with up to sixteen layers, so it is necessary to take account of the future appearance of multilayer discs with three layers or more. To perform focus control with a clear distinction between the individual layers of such multilayer discs, the linear range must be kept sufficiently less than the spacing between adjacent pairs of layers. If the linear range is made that small, however, the problem of extremely demanding focusing control for a CD arises, because in comparison with the other types of optical discs, a CD has a larger allowable wobble of the optical disc surface in the focusing direction. If the depth of focus is made large enough to accommodate the allowable CD wobble, however, then accurate focusing control for the higher-density optical discs becomes problematic, and distinguishing between the multiple layers of a multilayer disc becomes impossible. It is also necessary to take account of the inter-layer spacing in a multilayer disc. The inter-layer spacing in the dual-layer discs already commercialized has a center value of 55 μm for DVD discs and 25 μm for BD discs. The number of layers in future commercial discs and the spacing of the layers have not been decided yet, but it is reasonable to expect that the spacing will depend on the number of layers. The spacing between different layers may also be varied intentionally to mitigate the problem of stray light reflected from unintended layers, as proposed by Ichimura et al. In this case, the linear range will have to be optimized not only for the type of disc being used but also for the particular layer being accessed in the disc. The approximately factor-of-seven difference between the depths of focus required by the BD standard and CD standard makes it impossible to set a single linear range that can simultaneously meet the needs of both standards. With a conventional single optical detection system, it is not possible to create an optimal focus error signal for the blue disc standards, the DVD standard, and the CD standard. For a disc with three layers or more, it will not be possible to provide an optimal focus error detection unless the linear range can be adjusted to suit the number of layers and their spacing. Moreover, the linear range is also affected by manufacturing error in the focal length of the lenses in the optical pickup, positioning error in the mounting of the lenses and the assembly of the pickup, and variability in the lasing wavelength of the laser light sources, so even for the same type of disc, the linear range of the optical pickup varies from one manufactured pickup to another. For discs with a large number of layers with exacting spacing requirements, the linear range needs to be precisely defined. A conventional single optical detection system is incapable of providing the active control that would be needed to adjust the linear range to the different values required by multilayer discs or different layers in such discs.

SUMMARY OF THE INVENTION

An object of the present invention is to provide an optical pickup and an optical recording and reproducing device that can produce an optimal focus error signal for recording data on and reproducing data from optical discs despite the use of laser light of different wavelengths, and for recording data on and reproducing data from optical discs with any number of layers and any layer spacing.

The present invention provides an optical pickup that irradiates an optical disc with a laser beam while the optical disc is rotated by a rotational driving mechanism, and detects reflection from the optical disc. The optical pickup has a semiconductor laser device for generating at least two laser beams with different wavelengths, and an objective lens for focusing the laser beams generated by the semiconductor laser device onto the optical disc. A beam splitter disposed on a first optical path from the semiconductor laser device to the objective lens splits the reflected light that returns from the optical disc through the objective lens, and a photodetector receives one of the split parts of the reflected light.

A first optical element disposed on a second optical path from the optical disc to the photodetector has a variable first lens function for refracting the laser beams in a first direction in a plane perpendicular to the optical axis of the second optical path.

A second optical element disposed on the second optical path has a variable second lens function for refracting the laser beams at least in a second direction different from the first direction in the plane perpendicular to the optical axis of the second optical path.

An optical element driving circuit varies the lens functions of the first and second optical elements.

The invention also provides an optical disc drive including the above optical pickup and a rotational driving mechanism for rotating the optical disc irradiated with a laser beam by the optical pickup.

The variable lens functions of the first and second optical elements of the optical pickup enable the linear range of the focus error signal to be adjusted to different values tailored to the specifications of different types of optical discs.

DETAILED DESCRIPTION OF THE INVENTION

Embodiments of the invention will now be described with reference to the attached drawings, in which like elements are indicated by like reference characters.

First Embodiment

Figure 1:
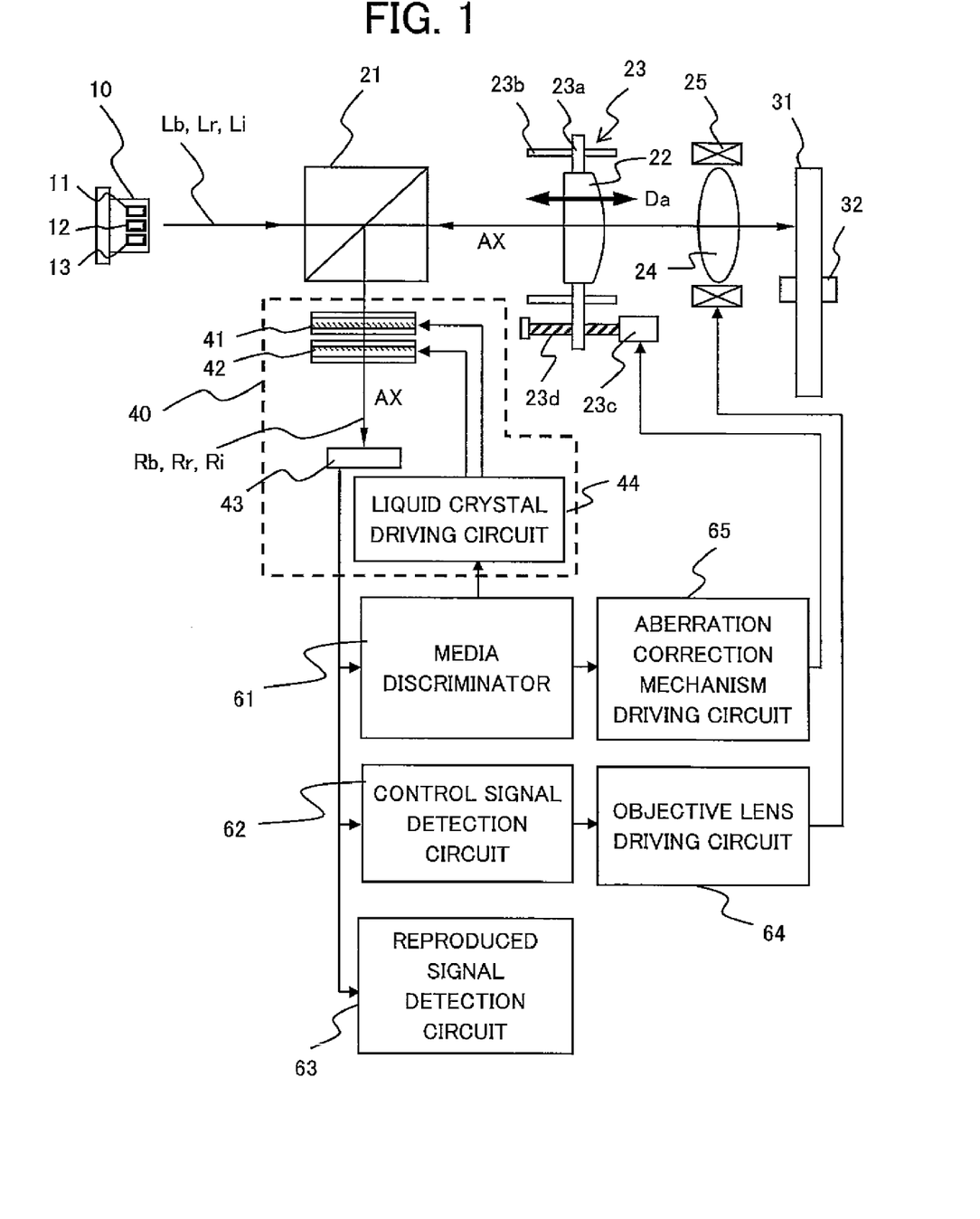
FIG. 1 is a schematic drawing of an optical pickup and optical disc drive according to a first embodiment of the invention.

The structure of an optical pickup according to a first embodiment is depicted schematically in FIG. 1 together with its control system and other parts of the optical disc drive in which the optical pickup is mounted. The control system is shown in block diagram form. The optical pickup includes a semiconductor laser device or module 10, a beam splitter 21, a collimator lens 22, a collimator lens driving mechanism 23, an objective lens 24, and an objective lens driving mechanism 25. The semiconductor laser module 10 generates a first (blue) laser beam Lb with a first center wavelength, a second (red) laser beam Lr with a second center wavelength longer than the first center wavelength, and a third (infrared) laser beam Li with a third center wavelength longer than the second center wavelength. The collimator lens 22 parallelizes the laser beams (Lb, Lr, Li) emitted from the semiconductor laser module 10. The collimator lens driving mechanism 23 moves the collimator lens 22 back and forth in the direction Da parallel to the optical axis AX of the optical path from the semiconductor laser module 10 to the objective lens 24. The objective lens 24 focuses the laser beam (Lb, Lr, or Li) that passes through the collimator lens 22. The objective lens driving mechanism 25 moves the objective lens 24 to keep the laser beam focused on the desired surface of the optical disc 31 and to follow the desired track. The optical disc 31 is mounted on and rotated by a rotational driving mechanism 32 including a turntable or spindle and other components (not shown), such as a motor.

The semiconductor laser module 10 has a first lasing region 11 that emits a first laser beam Lb, a second lasing region 12 that emits a second laser beam Lr, and a third lasing region 13 that emits a third laser beam Li. The laser beam emitted from the semiconductor laser module 10 is selected from laser beams Lb, Lr, and Li depending on the type of optical disc 31 on which information is being recorded or reproduced. The beam splitter 21 transmits the laser beam (Lb, Lr, or Li)

emitted from the semiconductor laser module 10 and alters the transmission direction of the returning light (Rb, Rr, or Ri) reflected from the optical disc 31. The returning light (Rb, Rr, or Ri) reflected from the optical disc 31 has its polarization changed by a polarizing element (not shown) before entering the beam splitter 21.

The collimator lens driving mechanism 23 has a lens holder 23a that holds the collimator lens 22, a guide shaft 23b that holds the lens holder 23a so that it is movable in direction Da, a motor 23c, and a rod screw 23d that is connected to the rotary shaft of the motor 23c and engages the threaded of a threaded hole in the lens holder 23a. When the motor 23c operates and the rod screw 23d turns, the lens holder 23a and collimator lens 22 move along the guide shaft 23b in direction Da.

In the first embodiment, the first laser beam Lb is blue with a first wavelength of, for example, 0.405 µm. The second laser beam Lr is red with a second wavelength of, for example, 0.65 µm. The third laser beam Li is infrared with a third wavelength of, for example, 0.78 µm. The invention is applicable, however to an optical disc drive in which the laser light sources emit only two laser beams with different wavelengths, or emit four or more laser beams with different wavelengths.

The optical pickup in the first embodiment also has an optical detection system 40 for detecting the reflected laser light Rb, Rr, Ri. The optical detection system 40 has a pair of liquid crystal elements 41, 42, a photodetector 43, and a liquid crystal driving circuit 44. The photodetector 43 detects the light (Rb, Rr, or Ri) returning from the optical disc 31 and reflected by the beam splitter 21 and outputs corresponding photodetection signals. Liquid crystal element 41 is disposed in the optical path from the optical disc 31 to the photodetector 43, has a variable lens function for refracting the laser beams in a first direction (direction Db in FIG. 3, as described below) in a plane perpendicular to an optical axis of the optical path from the optical disc 31 to the photodetector 43 (the direction of transmission of the returning light Rb, Rr, or Ri). Liquid crystal element 42 has a variable lens function for refracting the laser beams in a second direction (direction Dc in FIG. 3, as described below) in a plane perpendicular to the optical axis of the optical path from the optical disc 31 to the photodetector 43 (the direction of transmission of the returning light Rb, Rr, or Ri). The liquid crystal driving circuit 44 is an optical element driving circuit that varies the lens functions (refractive-index distribution) of the liquid crystal elements 41, 42. Preferably, the first direction Db and the second direction Dc in the first embodiment are orthogonal to each other.

The control system of the optical pickup in the first embodiment includes a media discriminator 61 that determines the type of optical disc 31 mounted on the rotational driving mechanism 32 of the optical disc drive from the photodetection signals output from the photodetector 43 and generates a decision signal indicating the type, a control signal detection circuit 62 that obtains a focus error signal and a tracking error signal from the photodetection signals, a reproduced signal detection circuit 63 that obtains a reproduced signal from the photodetection signals, a spherical aberration correction mechanism driving circuit 65 that drives the motor 23c of the collimator lens driving mechanism 23 according to the decision signal output from the media discriminator 61, and an objective lens driving circuit 64 that controls the objective lens driving mechanism 25 according to the focus error signal and tracking error signal output from the control signal detection circuit 62.

Figure 2:
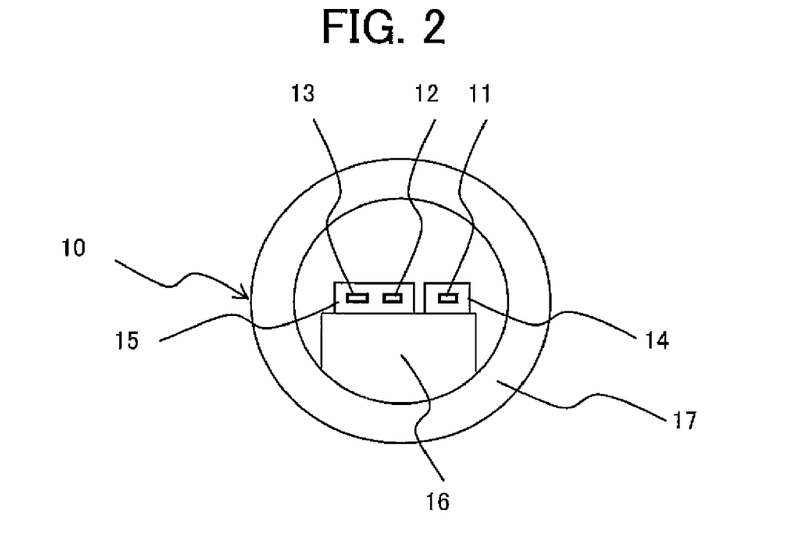
FIG. 2 is a schematic front view of the semiconductor laser device in the optical pickup in the first embodiment, as seen from the optical path of the laser light.

FIG. 2 schematically shows the semiconductor laser module 10 that provides the laser beams in the first embodiment as seen frontally, looking in from the light path of the laser beams. The semiconductor laser module 10 has a first semiconductor laser chip 14 including a first lasing region 11, a second semiconductor laser chip 15 including a second lasing region 12 and a third lasing region 13, a heat sink 16 supporting the first and second semiconductor laser chips 14, 15, and a package 17 supporting the heat sink 16. The first lasing region 11 of the first semiconductor laser chip 14 is a semiconductor region structured to emit the blue laser beam Lb, the second lasing region 12 of the second semiconductor laser chip 15 is a semiconductor region structured to emit the red laser beam Lr, and the third lasing region 13 of the second semiconductor laser chip 15 is a semiconductor region structured to emit the infrared laser beam Li.

Figure 3:
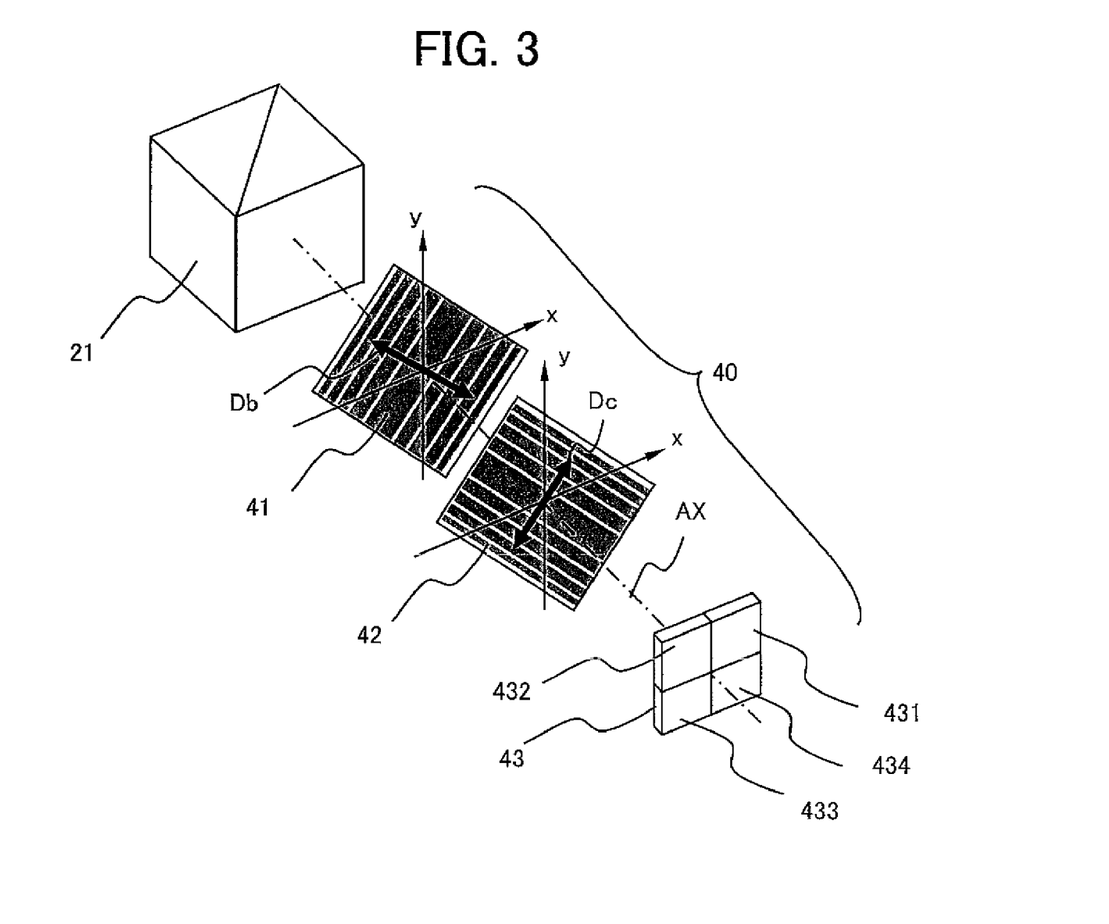
FIG. 3 is a schematic perspective view illustrating the disposition of the components constituting the optical detection system of the optical pickup in the first embodiment.

FIG. 3 schematically shows the positions of the components of the optical detection system 40 as seen in perspective view. The x- and y-axes correspond to, for example, radial and tangential directions on the optical disc 31. The liquid crystal elements 41, 42 act as identical lenses but each refracts light in just one direction, thereby performing the function of a cylindrical lens. Liquid crystal element 41 refracts light in direction Db (also called its lens action direction). Direction Db lies in the second quadrant of the xy coordinate system (between the negative x-axis and the positive y-axis) and the fourth quadrant of the xy coordinate system (between the positive x-axis and the negative y-axis), and is oriented at a 45-degree angle to the x- and y-axes. Liquid crystal element 42 refracts light in direction Dc (also called its lens action direction). Direction Dc lies in the first quadrant of the xy coordinate system (between the positive x- and y-axes) and the third quadrant of the xy coordinate system (between the negative x- and y-axes), and is oriented at a 45-degree angle to the x- and y-axes. In the first embodiment, the angle between directions Db and Dc is substantially 90 degrees. As also shown in FIG. 3, the light sensitive region of the photodetector 43 in the optical detection system 40 is divided into four quadrants 431, 432, 433, 434 by lines extending in the x-axis and y-axis directions. Directions Db and Dc are preferably oriented at a 45-degree angle to the x- and y-axes, but the angle need not be exactly 45 degrees. Any angle in the range of about 45±10 degrees is acceptable. Similarly, the angle between directions Db and Dc, although preferably about 90 degrees, may be any angle in the range of about 90±10 degrees.

Figure 4A:
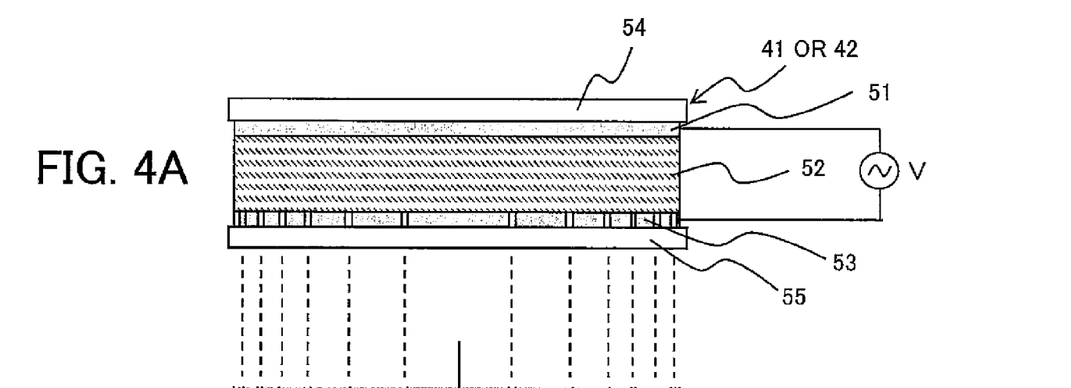
FIG. 4A is a side sectional view of one of the liquid crystal elements of the optical pickup in the first embodiment.
Figure 4B:
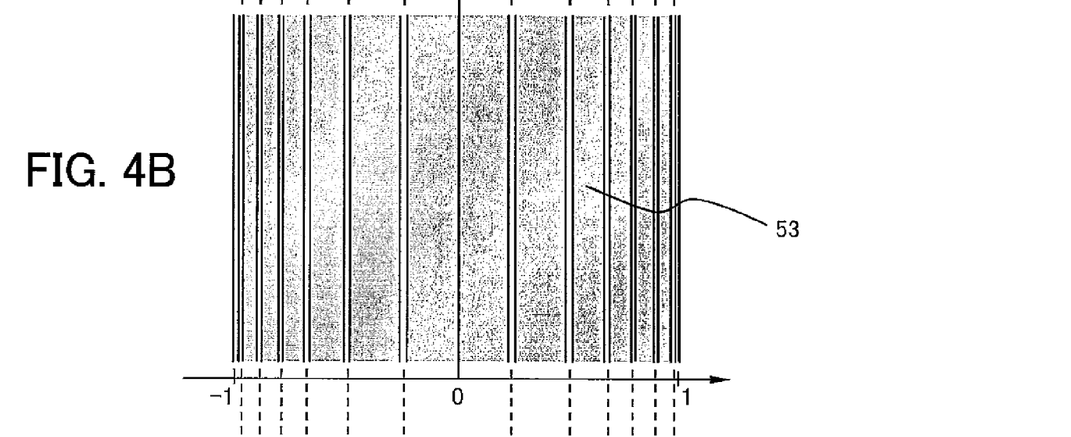
FIG. 4B is a plan view of the liquid crystal element in FIG. 4A.
Figure 4C:
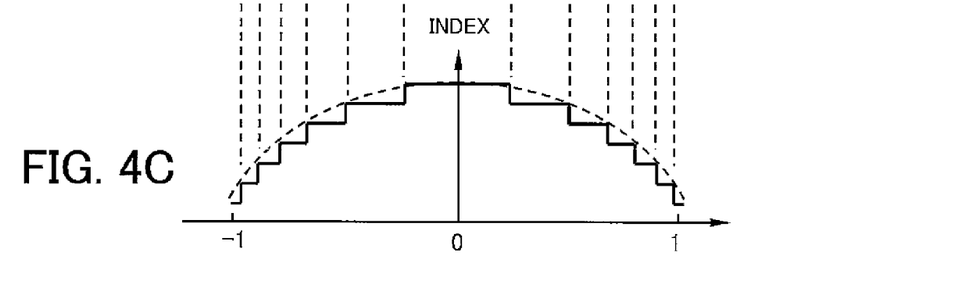
FIG. 4C illustrates the refractive index distribution of the liquid crystal element in FIG. 4A.

FIGS. 4A, 4B, and 4C show one of the two liquid crystal elements 41, 42 in greater detail, FIG. 4A showing a side view similar to the view in FIG. 1, FIG. 4B showing a plan view that reveals the pattern of the electrode elements, and FIG. 4C showing the distribution of the refractive index. As shown in FIG. 4A, each liquid crystal element 41 or 42 has a uniform electrode 51, an array of mutually parallel strip-shaped electrode elements 53, a liquid crystal layer 52 disposed between the uniform electrode 51 and the electrode elements 53, a glass plate 54 disposed exterior to uniform electrode 51, and a glass plate 55 disposed exterior to the electrode elements 53. A pulse voltage V is applied between the uniform electrode 51 and the electrode elements 53 by the liquid crystal driving circuit 44. As shown in FIG. 4B, the electrode elements 53 are arranged so that their width gradually decreases from the center to the outside. More precisely, when the distance from the central electrode to the outermost electrode in the electrode elements 53 is normalized to unity, the distance from the central electrode to the Mth electrode is the square root of M/N, where N is the number of divisions and M is an integer from one to N. Pairs of adjacent electrodes are connected by a conductor with high resistance. The solid line in FIG. 4C indicates that when a voltage is applied between the uniform electrode 51 and the electrode elements 53 of the liquid crystal elements 41, 42 in the first embodiment, their refractive index distribution has a staircase shape. The dotted line indicates that the refractive index at a particular electrode element 53 decreases in proportion to the square of its distance from the center of the array of electrode elements 53. Although FIGS. 4B and 4C illustrate a preferred electrode pattern and refractive index distribution, the electrode pattern and index distribution are not limited to this example; other electrode patterns and refractive index distributions are usable as well.

Figure 5:
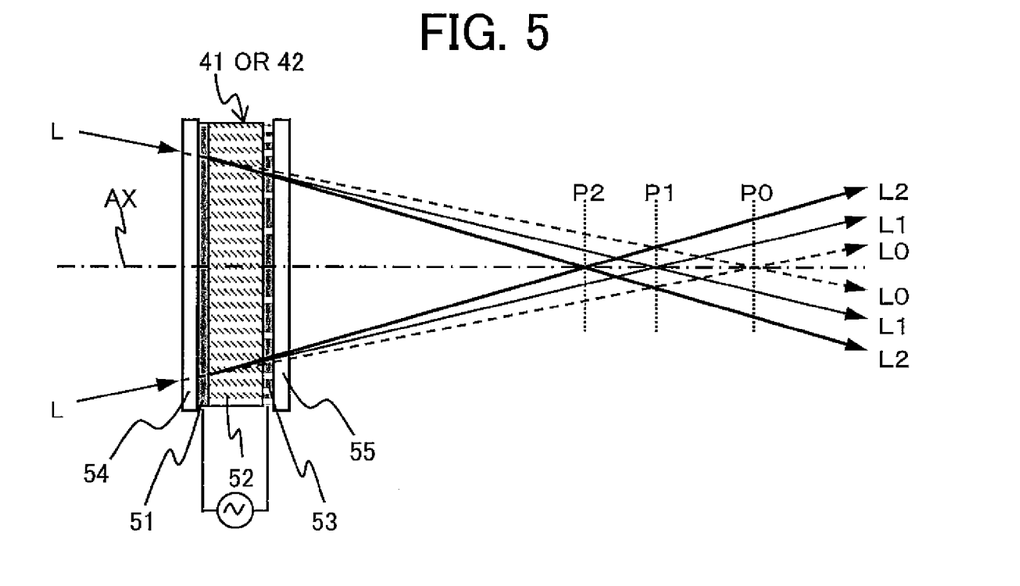
FIG. 5 illustrates the lens function of a liquid crystal element of the type used in the optical pickup in the first embodiment.

FIG. 5 illustrates the lens function of the liquid crystal element 41 or 42. The plurality of strip-shaped electrode elements 53 arrayed side by side in the vertical direction in FIG. 5 (direction Db or Dc in FIG. 3) give rise to a cylindrical lens function that refracts light in the vertical direction in FIG. 5. The solid lines labeled L represent a convergent laser beam incident on the liquid crystal element 41 or 42, which passes through the liquid crystal element 41 or 42 without refraction, as indicated by the dotted lines L0, when no voltage is applied, converging at a point P0 on the optical axis AX. The lens function arises when a voltage is applied to the liquid crystal element 41 or 42. If a voltage V1 is applied the beam converges to a point P1 in front of point P0, as indicated by the lines labeled L1. When a voltage V2 higher than voltage V1 is applied, the lens function is strengthened and the laser beam L2 (thick solid line) converges at a point P2 in front of P1, nearer to the liquid crystal element. The lens function can thus be varied by applying different voltages to the liquid crystal elements 41 or 42, causing the focal length of the lens and the point of convergence of the refracted light to vary.

Figure 6:
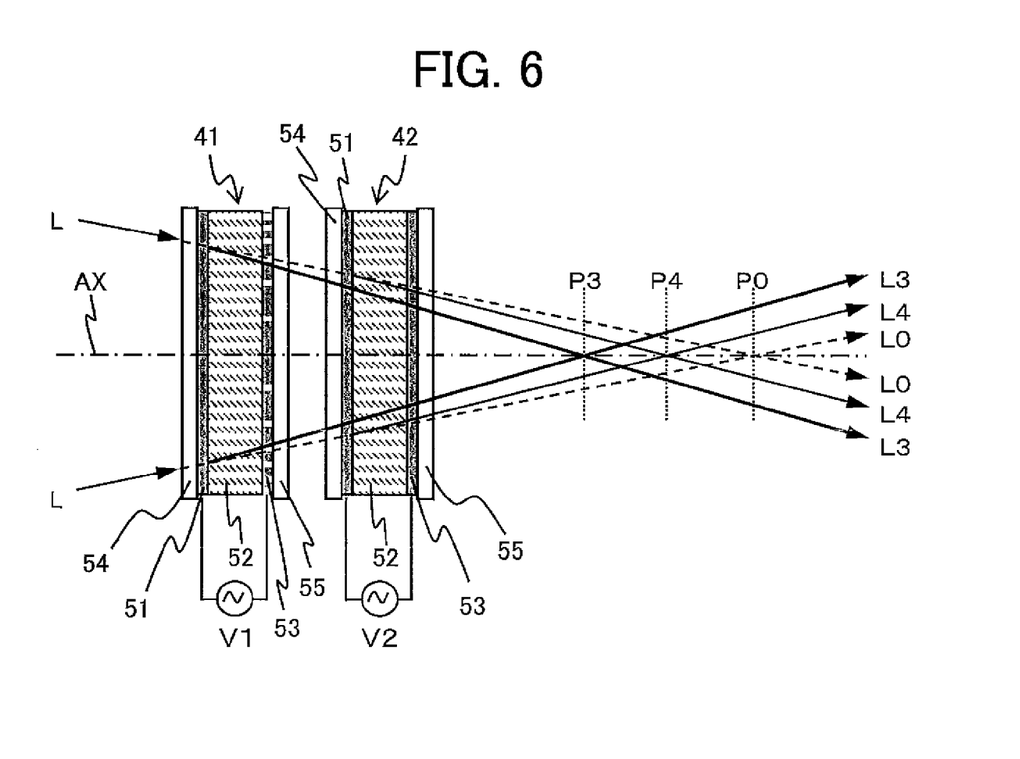
FIG. 6 schematically illustrates the combined lens function of the two liquid crystal elements in the optical pickup in the first embodiment.

FIG. 6 illustrates the combined lens function of the two liquid crystal elements 41, 42 in the optical pickup in the first embodiment. Liquid crystal element 41 is disposed so that its electrode elements 53 are arrayed side by side in the vertical direction in FIG. 6 (the vertical direction parallel to the drawing sheet). Liquid crystal element 42 is disposed just behind the liquid crystal element 41 (on the photodetector 43 side) with its electrode elements 53 arrayed in a direction perpendicular to the drawing sheet. In the first embodiment, the arrays of electrode elements 53 in the liquid crystal elements 41 and 42 are preferably aligned in mutually orthogonal directions, as shown in FIGS. 3 and 6. The solid lines labeled L in FIG. 6 represent two convergent rays of a laser beam incident on the liquid crystal element 41. The dotted lines labeled L0 show the rays as they pass through the liquid crystal elements 41, 42 when no voltage is applied and the liquid crystal elements 41, 42 produce no lens action, in which case the incident rays L passes straight through the liquid crystal elements 41, 42 with no change in transmission direction, and converge at point P0 on the optical axis AX. When voltage V1 is applied to the liquid crystal element 41 and voltage V2 is applied to the liquid crystal element 42, a cylindrical lens function arises in the liquid crystal element 41 in a vertical direction in FIG. 6, while a cylindrical lens function arises in the liquid crystal element 42 in the direction perpendicular to the drawing sheet. In this case, the lens function of liquid crystal element 41 causes the rays to converge at point P3 on the optical axis AX, as indicated by the thick solid lines L3, this vertical convergence being unaffected by the lens function of liquid crystal element 42. Similarly, the lens function of liquid crystal element 42 causes rays to converge at point P4 on the optical axis AX, as indicated by the thin solid lines L3, this horizontal convergence being unaffected by the lens function of liquid crystal element 41 (for visibility, the horizontal convergence is shown as a vertical convergence in FIG. 6). This optical phenomenon, in which light refracted in mutually orthogonal directions converges at different points, is known as astigmatism. By applying different voltages to the liquid crystal elements 41 and 42, it is possible to obtain varying degrees of astigmatism, with varying distances between points P3 and P4.

That the two liquid crystal elements 41, 42 with lens functions acting in mutually orthogonal or approximately orthogonal directions can create this type of astigmatism indicates that the optical detection system 40 can produce a focus error signal by the astigmatic detection method well known in the optical pickup art.

Figure 7:
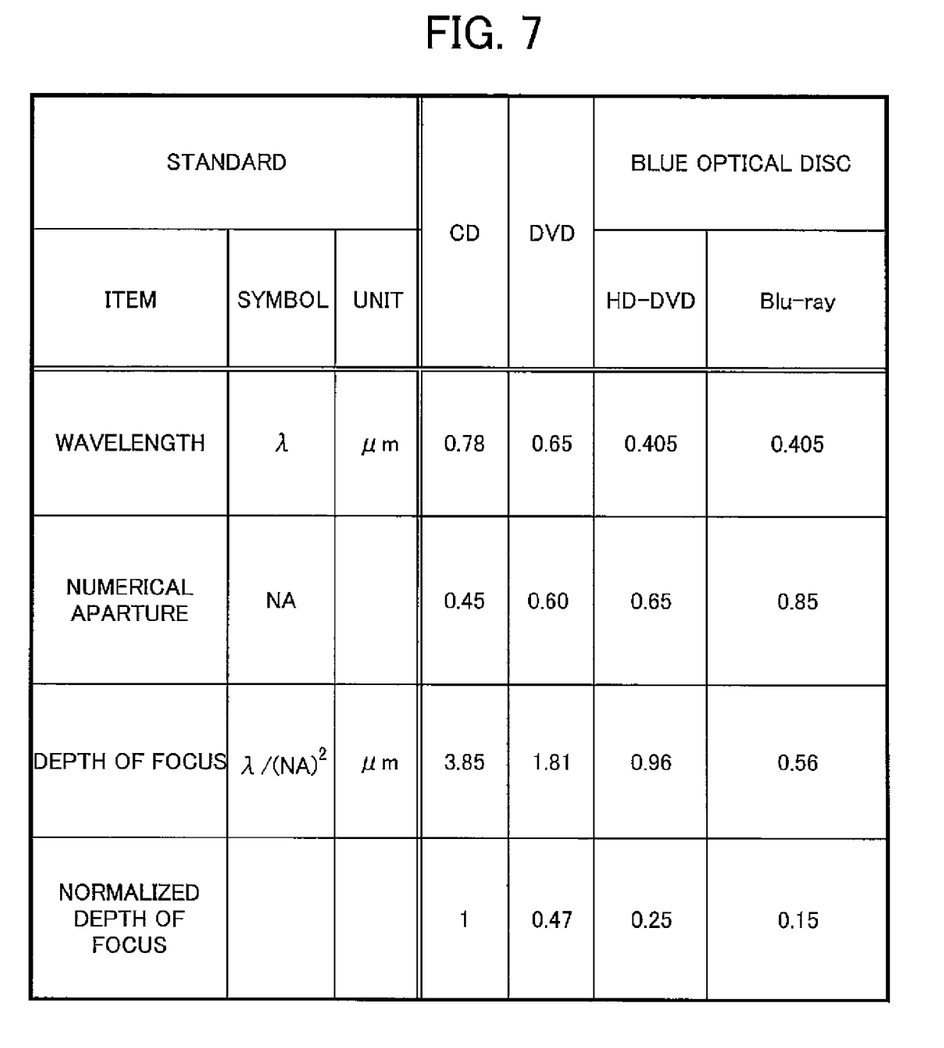
FIG. 7 is a table of optical disc specifications.

The operations required of the liquid crystal elements 41, 42 will now be described with reference to the optical disc specifications shown in FIG. 7, which lists the center wavelength ($\lambda$) and the numerical aperture of the objective lens (NA) specified for each type of optical disc, and the depth of focus ($\lambda/(NA)^2$) calculated from the center wavelength and numerical aperture, indicated both in micrometers and as a ratio normalized to the depth of focus in the CD specification. The depth of focus in the DVD specification is about half the depth of focus in the CD specification, and the depth of focus in the blue optical disc specifications is less than half the depth of focus in the DVD specification. The depth of focus in the BD specification, which has the highest density, is about 1/7 that of the CD specification, which has the lowest density. This being the case, conventional optical detection systems fail to produce a focus error signal with a linear range that conforms to all specifications. Examples of focus error signals 71, 72, 73 with conforming linear ranges LZ1, LZ2, LZ3 are shown schematically in FIGS. 9D to 9F and will be described later.

In this situation, optimal performance can be obtained if the linear range of the focus error signal can be set to an optimal value for each of these sets of disc specifications, despite their being only a single optical detection system. In the optical detection system 40 in the first embodiment, the cylindrical lens functions of the two liquid crystal elements 41, 42 can produce different amounts of astigmatism dependent on the voltage applied. The linear range can thereby be set to an optimal value for each optical disc specification.

The operation of the optical disc drive and optical pickup in the first embodiment will now be described. In order to maintain compatibility of the optical disc drive with a plurality of optical disc specifications, the linear range of the focus error signal must be optimal as described above, and spherical aberration caused by the thickness of the optical disc substrate must be corrected.

When the optical disc is mounted in the optical disc drive, accordingly, first the type of optical disc must be determined. The procedure is illustrated by the flowchart in FIG. 8. Laser beam Lb has a first wavelength of about 0.405 μm, and is used for blue optical disc referred to below as the first type of optical disc. Either of the two blue optical disc specifications, HD-DVD or BD, may be used in this example. The position of the collimator lens 22 optimal for a blue optical disc is referred to as the first collimator lens position. The linear range of the focus error signal optimal for a blue optical disc is referred to as the first linear range (range LZ1 in FIG. 9D, described below). Similarly, laser beam Lr has a second wavelength of about 0.65 μm, and is used for DVD referred to below as the second type of optical disc. The position of the collimator lens 22 optimal for a DVD is referred to as the second collimator lens position. The linear range of the focus error signal optimal for the second type of optical disc is referred to as the second linear range (range LZ2 in FIG. 9E, described later). Laser beam Li has a third wavelength of about 0.78 μm, and is used for a CD, referred to below as the third type of optical disc. The position of the collimator lens 22 optimal for the third type of optical disc is referred to as the third collimator lens position. The linear range of the focus error signal optimal for the third type of optical disc is referred to as the third linear range (range LZ3 in FIG. 9F, described below).

Figure 8:
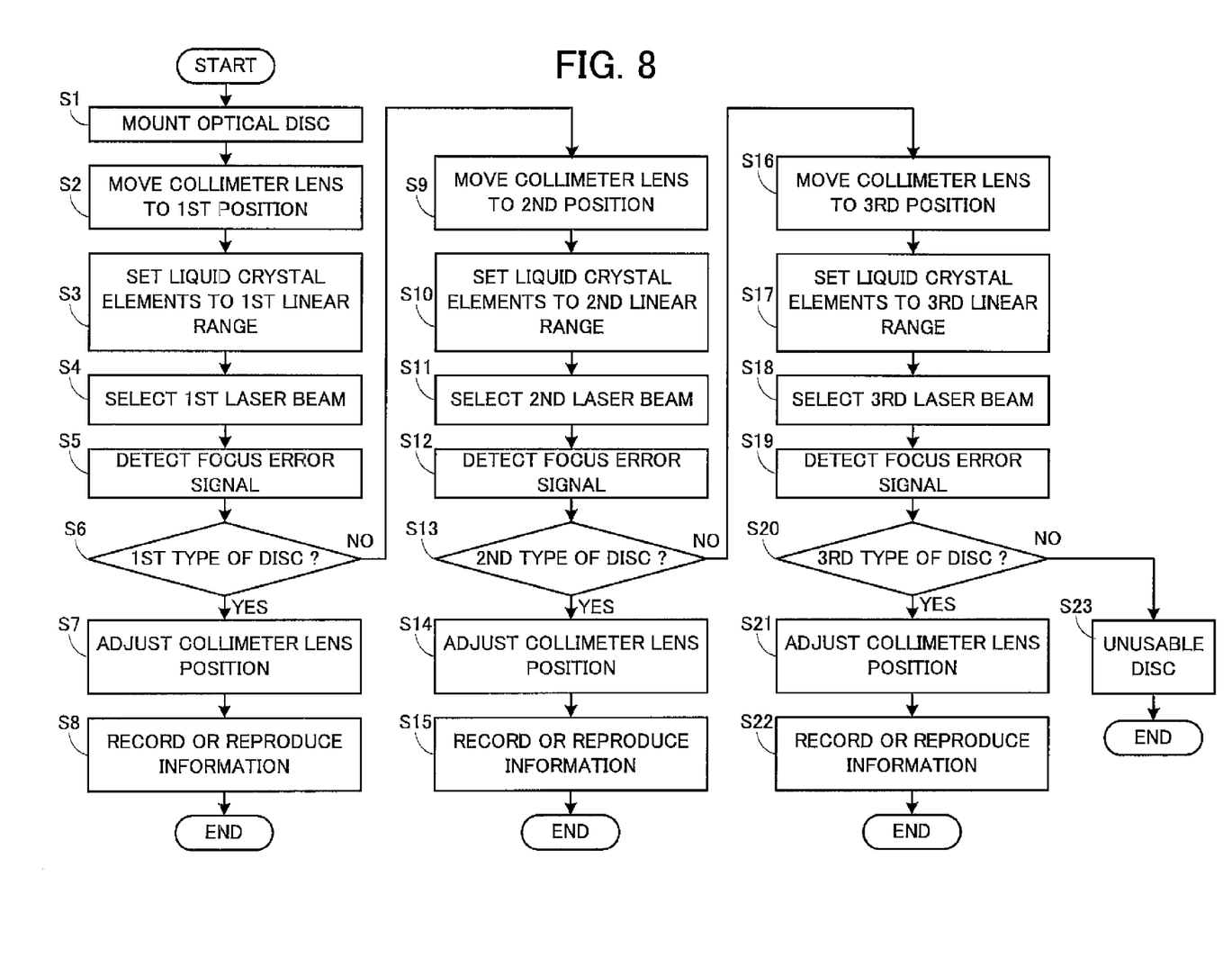
FIG. 8 is a flowchart illustrating operations from the mounting of an optical disc to the start of recording or reproduction by the optical disc drive in the first embodiment.

Referring to FIG. 8, when an optical disc of unknown type is mounted in the optical disc drive (step S1), the media discriminator 61 gives commands for initial settings fitting the first type of disc, which is a blue optical disc. The spherical aberration correction mechanism driving circuit 65 operates the collimator lens driving mechanism 23 according to these commands so that the collimator lens 22 is moved to the position that minimizes the spherical aberration arising from the thickness of the substrate of the first type of disc (step S2). The liquid crystal driving circuit 44 then operates according to these commands to apply predetermined voltages to the liquid crystal elements 41, 42 that set the linear range of the optical pickup to the first linear range (step S3). The first laser beam Lb is selected in this state (step S4). The laser beam Lb passes through the beam splitter 21, is collimated by the collimator lens 22, is focused to a spot on the optical disc 31 by the objective lens 24, and is reflected back from the optical disc 31 through the objective lens 24 and collimator lens 22 to the beam splitter 21, where it is reflected again and passes through liquid crystal element 41, then liquid crystal element 42. After passing through the liquid crystal elements 41, 42, the laser light is detected by the photodetector 43 to produce a focus error signal by the well-known astigmatic method (step S5) If the mounted optical disc is of the first type, the desired focus error signal will be obtained by the control signal detection circuit 62, causing the media discriminator 61 to identify the disc as an optical disc of the first type (step S6). In this case the operation proceeds to tracking control, in which the objective lens driving mechanism 25 is driven according to signals output from the objective lens driving circuit 64. Next, the spherical aberration correction mechanism driving circuit 65 operates the collimator lens driving mechanism 23 so as to obtain the best reproduced signal from the reproduced signal detection circuit 63, by adjusting the position of the collimator lens 22 to the position that minimizes spherical aberration (step S7). Information is then recorded on or read from the optical disc of the first type (step S8). If, however, the mounted optical disc is not an optical disc of the first type, the desired focus error signal is not detected by the control signal detection circuit 62, so the media discriminator 61 decides that the disc is not an optical disc of the first type.

In this case (No in step S6), the media discriminator 61 gives commands for initial settings fitting the second type of optical disc, which is a DVD. The spherical aberration correction mechanism driving circuit 65 operates the collimator lens driving mechanism 23 according to these commands so that the collimator lens 22 is moved to the position that minimizes the spherical aberration arising from the thickness of the DVD substrate (step S9 in FIG. 8). The liquid crystal driving circuit 44 then operates according to these commands to apply predetermined voltages to the liquid crystal elements 41, 42 that set the linear range of the optical pickup to the second linear range (step S10). The second laser beam Lr is selected in this state (step S11). A process similar to step S6 is carried out to identify whether the disc is an optical disc of the second type (step S13), based on the focus error signal detected by the control signal detection circuit 62 (step S12). If the mounted optical disc is of the second type, the operation proceeds to tracking control, in which the objective lens driving mechanism 25 is driven according to signals output from the objective lens driving circuit 64. Next, the spherical aberration correction mechanism driving circuit 65 operates the collimator lens driving mechanism 23 so as to obtain the best reproduced signal from the reproduced signal detection circuit 63, by moving the collimator lens 22 to the position that minimizes spherical aberration (step S14). Information is then recorded on or read from the optical disc of the second type (step S15). If, however, the mounted optical disc is not an optical disc of the second type, the desired focus error signal is not detected by the control signal detection circuit 62, so the media discriminator 61 decides that the disc is not an optical disc of the second type.

In this case (No in step S13), the media discriminator 61 gives commands for initial settings fitting the third type of disc, which is a CD. The spherical aberration correction mechanism driving circuit 65 operates the collimator lens driving mechanism 23 according to these commands so that the collimator lens 22 is moved to the position that minimizes the spherical aberration arising from the thickness of the CD substrate (step S16 in FIG. 8). The liquid crystal driving circuit 44 then operates according to these commands to apply predetermined voltages to the liquid crystal elements 41, 42 that set the linear range of the optical pickup to the third linear range (step S17). The third laser beam Li is selected in this state (step S18). A process similar to step S6 is carried out to identify whether the disc is an optical disc of the third type (step S20), based on the focus error signal detected at the control signal detection circuit 62 (step S19). If the mounted optical disc is of the third type, the operation proceeds to tracking control, in which the objective lens driving mechanism 25 is driven according to signals output from the objective lens driving circuit 64. Next, the spherical aberration correction mechanism driving circuit 65 operates the collimator lens driving mechanism 23 so as to obtain the best reproduced signal from the reproduced signal detection circuit 63, by moving the collimator lens 22 to the position that minimizes spherical aberration (step S21). Information is then recorded on or read from the optical disc of the third type (step S22). If, however, the mounted optical disc is not an optical disc of the third type (No in step S20), it may be a type of a disc that is incompatible with the optical disc drive, so it is determined that the disc cannot be used in this optical disc drive (step S23). Even if the disc is of one of the first to third types, a disc that is dirty or damaged may not be correctly identified. In this case, it is also determined that the disc cannot be used in this optical disc drive (step S23).

Figure 9A:
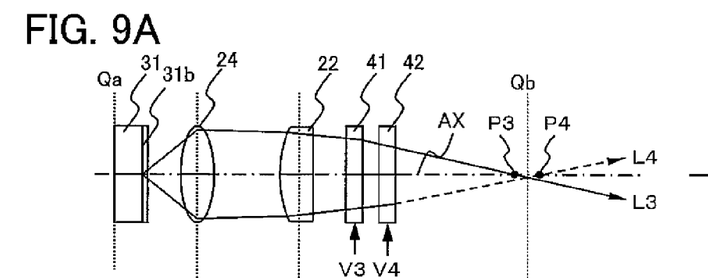
FIGS. 9A to 9F illustrate the operation and linear ranges of the optical detection system of the optical pickup in the first embodiment.
Figure 9B:
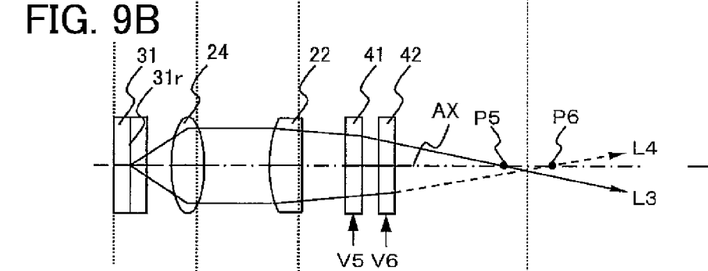
Figure 9C:
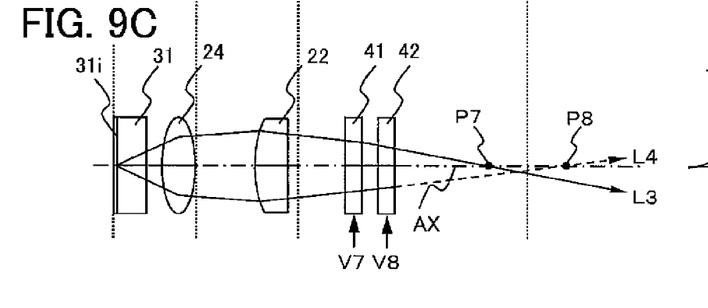

FIGS. 9A to 9F illustrate the operation and linear ranges LZ1, LZ2, LZ3 of the optical detection system of the optical pickup in the first embodiment. The optical detection system 40 is illustrated in schematic plan view in FIGS. 9A to 9C. The linear ranges LZ1, LZ2, LZ3 are illustrated in corresponding diagrams in FIGS. 9D to 9F that show waveforms of the focus error signals 71, 72, 73, the horizontal axis representing the actual focus error while the vertical axis represents the amplitude of the focus error signal. In FIGS. 9A to 9C, the light rays converging on the optical axis AX from above indicate the operation of liquid crystal element 41 in its lens action direction (direction Db in FIG. 3); the light rays converging on the optical axis AX from below indicate the operation of liquid crystal element 42 in its lens action (direction Dc in FIG. 3). FIG. 9A shows the collimator lens 22 and objective lens 24 positioned for the first type of optical disc, more specifically for a single-layer blue optical disc of the BD type; FIG. 9B shows the collimator lens 22 and objective lens 24 positioned for the second type of optical disc, more specifically for a single-layer DVD; FIG. 9C shows the collimator lens 22 and objective lens 24 positioned for the third type of optical disc, i.e., a CD. The surface of the optical disc 31 on which the laser beam is incident is located in a fixed reference position Qa in FIGS. 9A to 9C. The arrangement of the liquid crystal elements 41, 42 is fixed regardless of the type of optical disc 31. The position of the photodetector 43 (not shown) is also fixed at position Qb regardless of the type of optical disc 31. The collimator lens 22 and objective lens 24 are moved to different optimal positions depending on the type of the optical disc 31.

Figure 9D:
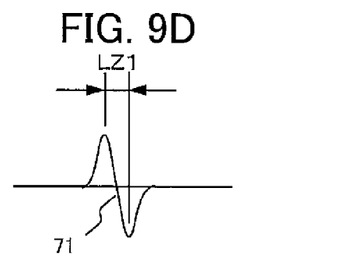

For the BD illustrated in FIG. 9A, the signal surface (information recording surface) 31b is situated at a depth of about 0.1 mm from the surface on which the laser beam Lb is incident. Focusing control is performed so that the objective lens driving circuit 64 and objective lens driving mechanism 25 move the objective lens 24 to a position where it can form a spot of light on the signal surface 31b. Control is also performed so that the spherical aberration correction mechanism driving circuit 65 and collimator lens driving mechanism 23 move the collimator lens 22 to a position where spherical aberration is minimized and the best reproduced signal is obtained. A voltage V3 is applied to liquid crystal element 41, producing a lens function that causes the returning laser light L3 to converge at point P3, as indicated by the solid line. A voltage V4 is applied to liquid crystal element 42, producing a lens function that causes the returning laser light L4 to converge at point 24, as indicated by the dotted line. Points P3 and P4 are located on opposite sides of the position Qb of the photodetector 43, at substantially equal distances from position Qb. The linear range LZ1 of the resulting focus error signal 71, shown in FIG. 9D, is proportional to the distance between points P3 and P4 in FIG. 9A, and has the value required for a BD.

Although the blue disc in the above explanation is a BD, the same explanation also applies to the case of an HD-DVD blue disc, with the difference that the signal surface 31b of an HD-DVD is situated at a depth of about 0.6 mm from the surface on which the laser beam Lb is incident.

Figure 9E:
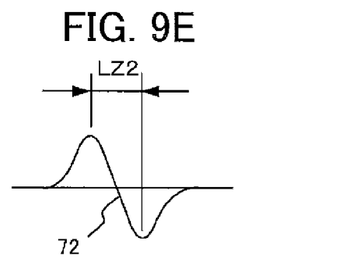

When the mounted disc is an optical disc of the second type, as shown in FIG. 9B, the signal surface 31r is situated at a depth of about 0.6 mm from the surface on which the laser beam Lr is incident. The objective lens 24 is brought closer to the optical disc 31 than in the BD case so that a light spot is formed on the signal surface 31r. The spherical aberration correction mechanism driving circuit 65 and collimator lens driving mechanism 23 are also controlled to move the collimator lens 22 to a position where spherical aberration is minimized and the best reproduced signal is obtained; the collimator lens 22 is moved nearer to the optical disc 31 than in the BD case. A voltage V5 is applied to liquid crystal element 41, producing a lens function that causes the returning laser light L3 to converge at point P5, as indicated by the solid line. A voltage V6 is applied to liquid crystal element 42, producing a lens function that causes the returning laser light L4 to converge at point P6, as indicated by the dotted line. Points P5 and P6 are located on opposite sides of the position Qb of the photodetector 43, at substantially equal distances from position Qb. The linear range LZ2 of the resulting focus error signal 72, shown in FIG. 9E, is proportional to the distance between points P5 and P6 in FIG. 9B, and has the value required for the second type of optical disc. Positions P5 and P6 are set so as to satisfy the condition LZ2>LZ1 required by the depth-of-focus relationship in FIG. 7.

Figure 9F:
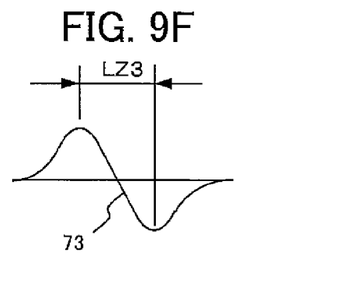

Similarly, when the mounted disc is an optical disc of the third type, as shown in FIG. 9C, the signal surface 31i is situated at a depth of about 1.2 mm from the surface on which the laser beam Li is incident. The objective lens 24 is brought closer to the optical disc 31 than in the case of the second type of optical disc, so that a light spot is formed on the signal surface 31i. The spherical aberration correction mechanism driving circuit 65 and collimator lens driving mechanism 23 are also controlled to move the collimator lens 22 to a position where spherical aberration is minimized and the best reproduced signal is obtained. A voltage V7 is applied to liquid crystal element 41, producing a lens function that causes the returning laser light L3 to converge at point P7, as indicated by the solid line. A voltage V8 is applied to liquid crystal element 42, producing a lens function that causes the returning laser light L4 to converge at point P8, as indicated by the dotted line. Points P7 and P8 are located on opposite sides of the position Qb of the photodetector 43, at substantially equal distances from position Qb. The linear range LZ3 of the resulting focus error signal 73, shown in FIG. 9F, is proportional to the distance between points P7 and P8, and has the value required for the third type of optical disc. Positions P7 and P8 are set so as to satisfy the condition LZ3>LZ2 required by the depth-of-focus relationship in FIG. 7.

In the preceding description, the linear ranges LZ1, LZ2, LZ3 of the first to third types of optical discs increase from LZ1 to LZ3 (LZ1<LZ2<LZ3), but if no focus control problems arise, the voltages applied to the liquid crystal elements may be selected so that LZ1 and LZ2 are substantially equal, for example, or so that LZ2 and LZ3 are substantially equal.

Standards exist for dual-layer blue discs (discs of the first type) and dual-layer DVDs (discs of the second type). In the explanation of steps S1 to S15 in FIG. 8 as above, and of FIGS. 9A to 9F, the same linear range can be used for either single-layer or dual-layer discs of the same type. However, in a dual-layer disc, the distance from the optical disc substrate differs depending on which signal surface is being used. It is therefore necessary to move the collimator lens 22 to a position where spherical aberration is minimized for each signal surface. As the collimator lens 22 is moved, the vertical magnification of the optical system changes according to the arrangement of the collimator lens 22 and the collimator lens driving mechanism 23, causing a slight change in the linear range. Therefore, in order to assure the same linear range for both layers of a dual-layer disc, different voltages may be applied to the liquid crystal elements for each signal surface.

Most currently available multilayer optical discs are dual-layer discs with a standardized separation between the two layers. To meet the demand for larger recording capacity, however, multilayer discs having more than two layers are now being developed, as noted above. Multilayer optical discs provide a recording capacity that increases in proportion to the number of layers, so it is likely that a variety of discs with different numbers of layers and different inter-layer spacings may become available in the future. It would be desirable be able to adjust the linear range of the focus error signal to the optimal value for any number of layers and any inter-layer spacing.

Figure 10A:
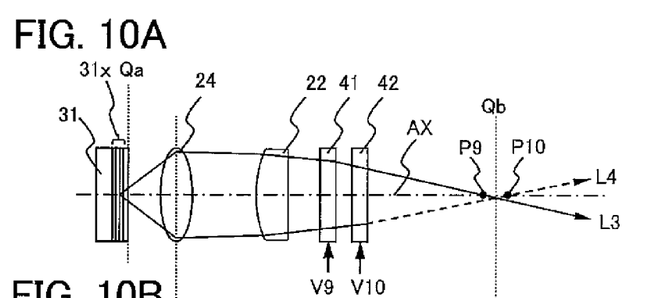
FIGS. 10A to 10F illustrate the operation and linear ranges of the optical detection system of the optical pickup in the first embodiment when a multilayer disc is mounted.
Figure 10B:
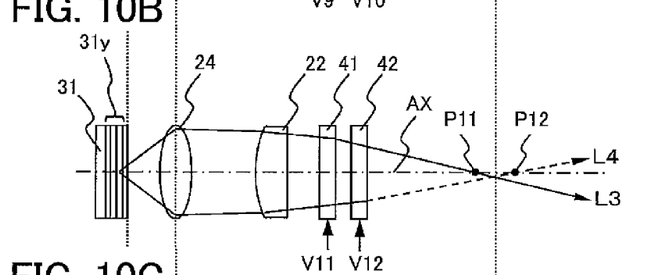
Figure 10C:
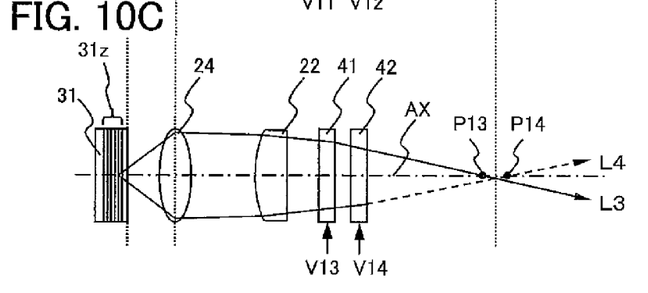
Figure 10D:
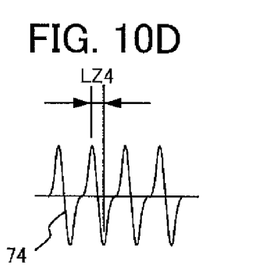
Figure 10E:
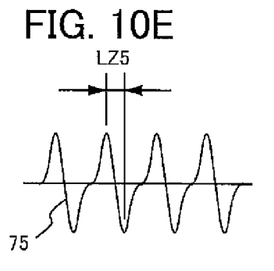
Figure 10F:
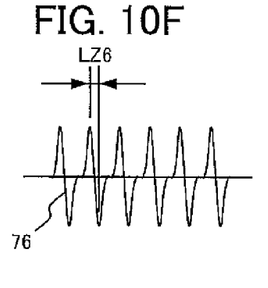

FIGS. 10A to 10F schematically illustrate the operation and linear ranges LZ4, LZ5, LZ6 of the optical detection system 40 optical pickup in the first embodiment for different interlayer separations when, for example, the optical disc 31 has four or more signal layers. The optical detection system 40 is illustrated in a schematic plan view in FIGS. 10A to 10C. The linear ranges LZ4, LZ5 LZ6 are illustrated in corresponding diagrams in FIGS. 10D to 10F that show waveforms of the focus error signals 74, 75, 76, the horizontal axis representing the actual focus error while the vertical axis represents the amplitude of the focus error signal. In FIGS. 10A to 10C, the light rays converging on the optical axis AX from above indicate the operation of liquid crystal element 41 in its lens action direction (direction Db in FIG. 3); the light rays converging on the optical axis AX from below indicate the operation of liquid crystal element 42 in its lens action (direction Dc in FIG. 3). Although the optical discs 31 in FIGS. 10A to 10C have different numbers of layers and different inter-layer spacing, in each case information is recorded or reproduced by light of the same wavelength with the same objective lens specifications. The optical discs 31 in FIGS. 10A and 10B are four-layer discs; the optical disc 31 in FIG. 10C is a six-layer disc. The distance from the first layer to the last layer has a certain value Dx in FIG. 10A and a larger value Dy in FIGS. 10B and 10C. The spacing between the signal layers is larger in FIG. 10B than in FIG. 10A (because Dy>Dx). The spacing between the signal layers is smaller in FIG. 10C than in FIG. 10B, because there are more layers in the same space. By varying the voltages applied to the liquid crystal elements 41, 42, optimal linear ranges LZ4, LZ5, and LZ6 for each inter-layer spacing can be obtained (LZ5>LZ4 and LZ6<LZ5), as shown in FIGS. 10D, 10E, and 10F.

Although it was assumed in the preceding description that the layers were equally spaced, this is not a limitation. If the layers are unequally spaced, the voltages applied to the liquid crystal elements 41, 42 can be adjusted so as to obtain a linear range allowing sufficient detection of focus error in the signal layers with the narrowest spacing. The explanation above used four and six layers as examples, but there may be any number of layers.

Manufacturing error in the focal length of the lenses in the optical pickup, positioning error in the mounting of the lenses and the assembly of the pickup, and variability in the lasing wavelengths of the semiconductor laser devices also affect the linear range of the focus error signal, causing it to vary from one optical pickup to another. The accuracy requirement on the linear range is stricter in discs having more layers, because of the smaller and more precise spacing between the layers, but since the linear range in the present invention can be adjusted by applying different voltages to the liquid crystal elements 41, 42, it can be adjusted to compensate for manufacturing variations and hold the linear ranges to strictly defined values. Specifically, when focus error signals are detected in steps S5, S13, and S19 in the flowchart in FIG. 8, the linear range can be calculated by using a sample-and-hold technique to sample the peak and bottom levels of the focus error signal, for example, and with this information in hand, the voltages applied to the liquid crystal elements can be adjusted to correct for deviation from the optimal linear range due to manufacturing variability.

The liquid crystal elements 41, 42 in the preceding description had a cylindrical lens function and were disposed so that their lens functions acted in substantially orthogonal directions, but the liquid crystal elements 41, 42 may be combined into a single liquid crystal unit.

Although liquid crystal elements 41, 42 were used in the optical detection system 40 in the first embodiment as described above, elements other than liquid crystal elements may be used instead, provided they provide an adjustable astigmatic effect.

Figure 11:
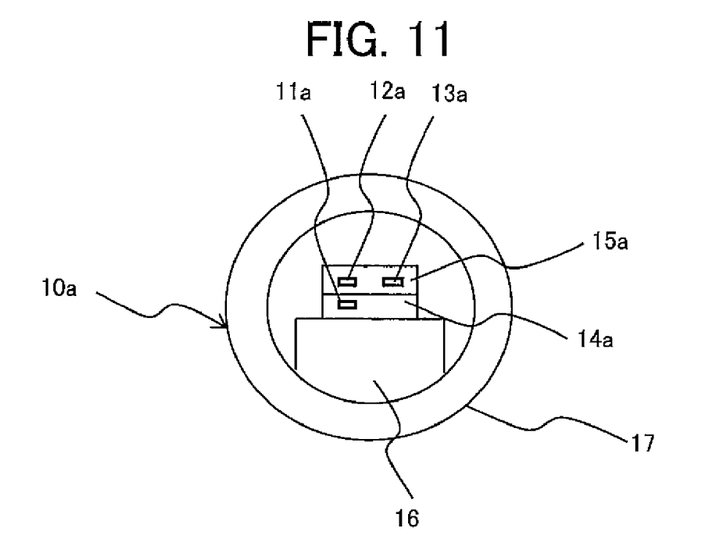
FIG. 11 is a schematic front view of the semiconductor laser of the optical pickup in a variation of the first embodiment, seen from the optical path of the laser beams.

The semiconductor laser module 10 in the first embodiment had three lasing regions 11, 12, 13 disposed side by side on the heat sink 16, but the arrangement shown in FIG. 11 may be used instead. FIG. 11 is a schematic front view of the semiconductor laser of the optical pickup in a variation of the first embodiment, seen from the optical path of the laser beams. The semiconductor laser module 10a shown in FIG. 11 has a heat sink 16, a first semiconductor laser chip 14a having a first lasing region 11a, and a second semiconductor laser chip 15a having side-by-side second and third lasing regions 12a and 13a, but the second semiconductor laser chip 15a is mounted on the first semiconductor laser chip 14a, instead of beside it as in FIG. 2. In both FIGS. 2 and 11 the second semiconductor laser chip 15 or 15a has two emitting regions, but this is not a limitation. The semiconductor laser device may have any structure capable of emitting a plurality of laser beams with different wavelengths.

In FIG. 8, when an unknown type of optical disc 31 is mounted in the optical disc drive, to determine its type, the mounted optical disc is first assumed to be a blue disc (steps S1-S8), then a DVD (steps S9-S15), then a CD (steps S16-S22), but the processing need not be performed in this order (of assumed type of optical disc); any other order may be used instead.

Furthermore, in the above explanation, when an unknown type of optical disc 31 is mounted on the optical disc drive, he type of optical disc is identified according to the type of focus error signal it produces, but the invention is not limited to this method. The type of optical disc may be identified by other methods.

In the above explanation, three types of optical discs (BD, DVD, CD) are used as examples of discs having different optimal linear ranges. Since the linear range of the focus error signal can be varied by liquid crystal elements, however, the optical pickup and optical disc drive according to the invention can accommodate other types of discs in addition to these three types.

In the above explanation, the collimator lens 22 is moved to correct spherical aberration of the optical disc 31. However, the spherical aberration can be corrected in any other suitable manner.

Second Embodiment

Figure 12:
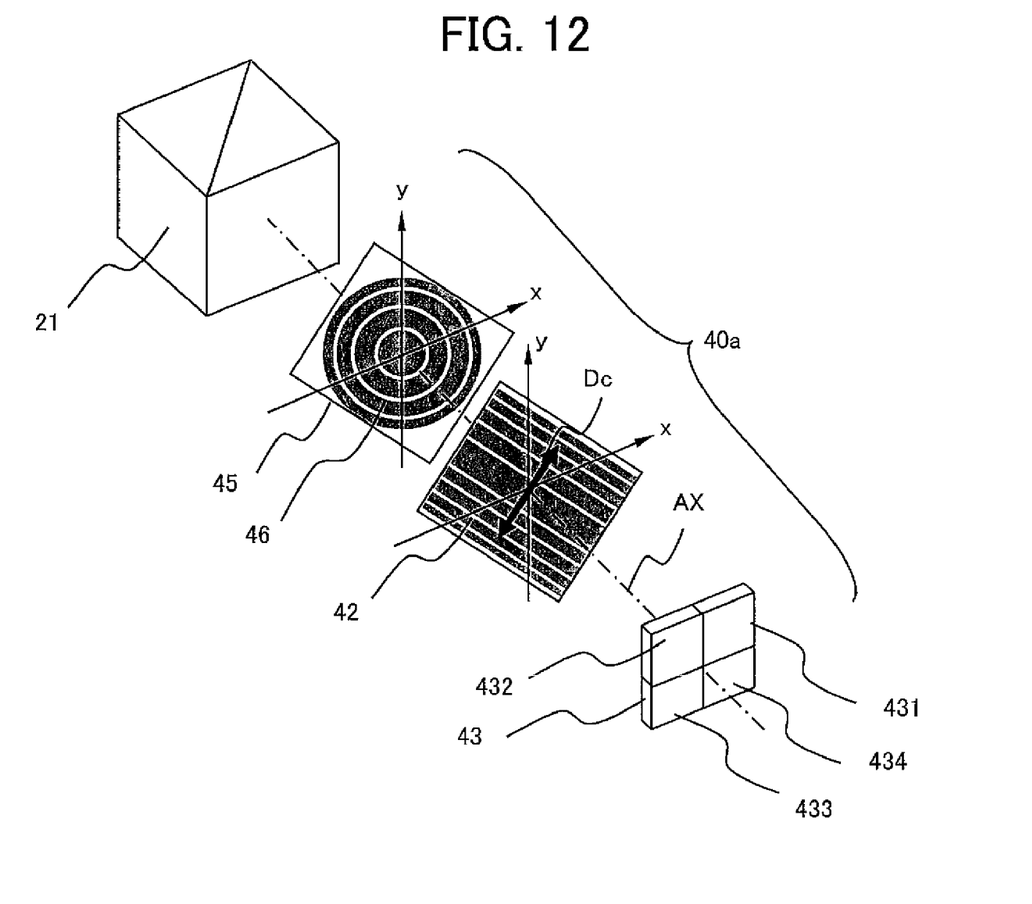
FIG. 12 is a schematic perspective view showing the disposition of the components constituting the optical detection system of an optical pickup according to a second embodiment.

FIG. 12 schematically shows the disposition of the components constituting the optical detection system of an optical pickup according to a second embodiment in perspective view, using the same reference characters as in FIG. 3 for identical or corresponding elements. The beam splitter 21 is identical to the beam splitter 21 in FIG. 3 and is disposed in the same position. Liquid crystal element 45 replaces liquid crystal element 41 in FIG. 3. Liquid crystal element 45 has a concentric pattern of annular electrode elements 46 in which the width of the electrode elements 46 decreases from the center to the circumference. More precisely, if the distance from the center of the concentric electrode array to the outermost electrode element 46 (the radius of concentric electrode pattern) is normalized to unity, the radial distance from the center to the Mth electrode element 46 is the square root of M/N, where N is the number of divisions in the array and M is an integer from one to N. Pairs of adjacent electrode elements 46 are connected by a conductor with high resistance. The refractive index generated by applying a voltage between the uniform electrode (not shown) of the liquid crystal element 45 and the electrode elements 46 has a staircase distribution. The refractive index at a particular electrode element 46 decreases in proportion to the square of the radial distance of the electrode element 46 from the center of the array. Therefore, the liquid crystal element 45 has a lens function similar to that of an ordinary convex or concave lens. In the optical detection system 40a, astigmatism is obtained by combining a liquid crystal element 45 having an ordinary lens function and a liquid crystal element 42 having a cylindrical lens function. By varying the voltages applied to the liquid crystal elements 42 and 45, a focus error signal having a desired linear range can be obtained.

Liquid crystal element 45 may be disposed either in front of liquid crystal element 42 (on the side nearer the beam splitter 21) or behind liquid crystal element 42 (on the side nearer the photodetector 43). The above descriptions show preferred patterns of electrode elements and describe preferred refractive index distributions, but the electrode pattern and index distribution are not limited to the pattern and distribution described; other electrode patterns and refractive index distributions are also usable.

In other regards, the first and second embodiments are identical.

Those skilled in the art will recognize that further variations are possible within the scope of the invention, which is defined in the appended claims.

What is claimed is:

1. An optical pickup that irradiates an optical disc with a laser beam while the optical disc is rotated by a rotational driving mechanism and detects laser light reflected from the optical disc, the optical pickup comprising:
    a semiconductor laser device for generating at least two laser beams with different wavelengths;
    an objective lens for focusing the laser beams generated by the semiconductor laser device onto the optical disc;
    a beam splitter disposed on a first optical path defined from the semiconductor laser device to the optical disc, the objective lens disposed on the first optical path, and used for splitting the reflected laser light that returns from the optical disc through the objective lens;
    a photodetector for receiving the reflected laser light from the beam splitter and outputting at least one photodetection signal;
    a first optical element disposed on a second optical path defined from the beam splitter to the photodetector, wherein the objective lens is not disposed on the second optical path, having a variable first lens function for refracting the reflected laser light in a first direction in a plane perpendicular to an optical axis of the second optical path;
    a second optical element disposed on the second optical path, having a variable second lens function for refracting the reflected laser light at least in a second direction different from the first direction in the plane perpendicular to the optical axis of the second optical path; and
    an optical element driving circuit for varying the first lens function of the first optical element and the second lens function of the second optical element.

2. An optical pickup that irradiates an optical disc with a laser beam while the optical disc is rotated by a rotational driving mechanism and detects laser light reflected from the optical disc, the optical pickup comprising:
    a semiconductor laser device for generating at least two laser beams with different wavelengths;
    an objective lens for focusing the laser beams generated by the semiconductor laser device onto the optical disc;
    a beam splitter disposed on a first optical path from the semiconductor laser device to the objective lens for splitting that reflected laser light that returns from the optical disc through the objective lens;
    a photodetector for receiving the reflected laser light from the beam splitter and outputting at least one photodetection signal;
    a first optical element disposed on a second optical path from the optical disc to the photodetector, having a variable first lens function for refracting the reflected laser light in a first direction in a plane perpendicular to an optical axis of the second optical path;
    a second optical element disposed on the second optical path, having a variable second lens function for refracting the reflected laser light at least in a second direction different from the first direction in the plane perpendicular to the optical axis of the second optical path; and
    an optical element driving circuit for varying the first lens function of the first optical element and the second lens function of the second optical element;
    wherein the first direction and the second direction are mutually orthogonal.

3. The optical pickup of claim 2, wherein:
    the first optical element is a first liquid crystal element that includes a first uniform electrode, a plurality of first electrode elements arrayed in the first direction, and a first liquid crystal layer disposed between the first uniform electrode and the plurality of first electrode elements;
    the second optical element is a second liquid crystal element that includes a second uniform electrode, a plurality of second electrode elements arrayed in the second direction, and a second liquid crystal layer disposed between the second uniform electrode and the plurality of second electrode elements; and
    the optical element driving circuit is a liquid crystal driving circuit.

4. The optical pickup of claim 1, wherein the second optical element refracts the laser beams in a radial direction of a circle centered on the optical axis in the plane perpendicular to the optical axis.

5. An optical pickup that irradiates an optical disc with a laser beam while the optical disc is rotated by a rotational driving mechanism and detects laser light reflected from the optical disc, the optical pickup comprising:
    a semiconductor laser device for generating at least two laser beams with different wavelengths;
    an objective lens for focusing the laser beams generated by the semiconductor laser device onto the optical disc;
    a beam splitter disposed on a first optical path from the semiconductor laser device to the objective lens for splitting that reflected laser light that returns from the optical disc through the objective lens;
    a photodetector for receiving the reflected laser light from the beam splitter and outputting at least one photodetection signal;
    a first optical element disposed on a second optical path from the optical disc to the photodetector, having a variable first lens function for refracting the reflected laser light in a first direction in a plane perpendicular to an optical axis of the second optical path;
    a second optical element disposed on the second optical path, having a variable second lens function for refracting the reflected laser light at least in a second direction different from the first direction in the plane perpendicular to the optical axis of the second optical path; and
    an optical element driving circuit for varying the first lens function of the first optical element and the second lens function of the second optical element; wherein:
    the second optical element refracts the laser beams in a radial direction of a circle centered on the optical axis in the plane perpendicular to the optical axis;
    the first optical element is a first liquid crystal element that includes a first uniform electrode, a plurality of mutually parallel strip-shaped first electrode elements arrayed in the first direction, and a first liquid crystal layer disposed between the first uniform electrode and the plurality of the first electrode elements;

the second optical element is a second liquid crystal element that includes a second uniform electrode, a plurality of concentric annular second electrode elements, and a second liquid crystal layer disposed between the second uniform electrode and the plurality of second electrode elements; and the optical element driving circuit is a liquid crystal driving circuit.

6. An optical pickup that irradiates an optical disc with a laser beam while the optical disc is rotated by a rotational driving mechanism and detects laser light reflected from the optical disc, the optical pickup comprising:

a semiconductor laser device for generating at least two laser beams with different wavelengths;

an objective lens for focusing the laser beams generated by the semiconductor laser device onto the optical disc;

a beam splitter disposed on a first optical path from the semiconductor laser device to the objective lens for splitting that reflected laser light that returns from the optical disc through the objective lens;

a photodetector for receiving the reflected laser light from the beam splitter and outputting at least one photodetection signal;

a first optical element disposed on a second optical path from the optical disc to the photodetector, having a variable first lens function for refracting the reflected laser light in a first direction in a plane perpendicular to an optical axis of the second optical path;

a second optical element disposed on the second optical path, having a variable second lens function for refracting the reflected laser light at least in a second direction different from the first direction in the plane perpendicular to the optical axis of the second optical path;

an optical element driving circuit for varying the first lens function of the first optical element and the second lens function of the second optical element;

a media discriminator for determining the type of the optical disc from the at least one photodetection signal output from the photodetector; and a control signal detection circuit for generating at least a focus error signal from the at least one photodetection signal output from the photodetector; wherein the optical element driving circuit varies the lens functions of the first and second optical elements according to the decision signal output from the media discriminator so that a range of linearity of a relationship between focusing error of the laser beams and the focusing error signal has a value preset for the type of the optical disc, a number of signal surfaces in the optical disc, or a spacing between the signal surfaces in the optical disc.

7. An optical pickup that irradiates an optical disc with a laser beam while the optical disc is rotated by a rotational driving mechanism and detects laser light reflected from the optical disc, the optical pickup comprising:

a semiconductor laser device for generating at least two laser beams with different wavelengths;

an objective lens for focusing the laser beams generated by the semiconductor laser device onto the optical disc;

a beam splitter disposed on a first optical path from the semiconductor laser device to the objective lens for splitting that reflected laser light that returns from the optical disc through the objective lens;

a photodetector for receiving the reflected laser light from the beam splitter and outputting at least one photodetection signal;

a first optical element disposed on a second optical path from the optical disc to the photodetector, having a variable first lens function for refracting the reflected laser light in a first direction in a plane perpendicular to an optical axis of the second optical path;

a second optical element disposed on the second optical path, having a variable second lens function for refracting the reflected laser light at least in a second direction different from the first direction in the plane perpendicular to the optical axis of the second optical path;

an optical element driving circuit for varying the first lens function of the first optical element and the second lens function of the second optical element;

a media discriminator for determining the type of the optical disc from the at least one photodetection signal output from the photodetector; and a control signal detection circuit for generating at least a focus error signal from the at least one photodetection signal output from the photodetector; wherein the optical element driving circuit varies the lens functions of the first and second optical elements according to the decision signal output from the media discriminator so that a range of linearity of a relationship between focusing error of the laser beams and the focusing error signal falls within a range defined for the type of the optical disc according to an optical disc specification.

8. An optical pickup that irradiates an optical disc with a laser beam while the optical disc is rotated by a rotational driving mechanism and detects laser light reflected from the optical disc, the optical pickup comprising:

a semiconductor laser device for generating at least two laser beams with different wavelengths;

an objective lens for focusing the laser beams generated by the semiconductor laser device onto the optical disc;

a beam splitter disposed on a first optical path from the semiconductor laser device to the objective lens for splitting that reflected laser light that returns from the optical disc through the objective lens;

a photodetector for receiving the reflected laser light from the beam splitter and outputting at least one photodetection signal;

a first optical element disposed on a second optical path from the optical disc to the photodetector, having a variable first lens function for refracting the reflected laser light in a first direction in a plane perpendicular to an optical axis of the second optical path;

a second optical element disposed on the second optical path, having a variable second lens function for refracting the reflected laser light at least in a second direction different from the first direction in the plane perpendicular to the optical axis of the second optical path; and an optical element driving circuit for varying the first lens function of the first optical element and the second lens function of the second optical element; wherein:

said at least two laser beams with different wavelengths are two laser beams with different wavelengths; and said different wavelengths are two wavelengths, each center wavelength of which is selected from a group consisting of three wavelengths of 0.405 μm, 0.65 μm, and 0.78 μm.

9. An optical pickup that irradiates an optical disc with a laser beam while the optical disc is rotated by a rotational driving mechanism and detects laser light reflected from the optical disc, the optical pickup comprising:

a semiconductor laser device for generating at least two laser beams with different wavelengths;

an objective lens for focusing the laser beams generated by the semiconductor laser device onto the optical disc;

a beam splitter disposed on a first optical path from the semiconductor laser device to the objective lens for splitting that reflected laser light that returns from the optical disc through the objective lens;

a photodetector for receiving the reflected laser light from the beam splitter and outputting at least one photodetection signal;

a first optical element disposed on a second optical path from the optical disc to the photodetector, having a variable first lens function for refracting the reflected laser light in a first direction in a plane perpendicular to an optical axis of the second optical path;

a second optical element disposed on the second optical path, having a variable second lens function for refracting the reflected laser light at least in a second direction different from the first direction in the plane perpendicular to the optical axis of the second optical path; and an optical element driving circuit for varying the first lens function of the first optical element and the second lens function of the second optical element; wherein:

said at least two laser beams with different wavelengths are three or more laser beams with different wavelengths; and said three or more laser beams with different wavelengths include a first laser beam with a center wavelength of 0.405 μm, a second laser beam with a center wavelength of 0.65 μm, and a third laser beam with a center wavelength of 0.78 μm.

10. A optical disc drive, comprising:
the optical pickup of claim 1; and
a rotational driving mechanism for rotating the optical disc irradiated with laser beams by the optical pickup.

11. The optical pickup of claim 1, wherein the first direction and the second direction are mutually orthogonal.

12. The optical pickup of claim 11, wherein:
the first optical element is a first liquid crystal element that includes a first uniform electrode, a plurality of first electrode elements arrayed in the first direction, and a first liquid crystal layer disposed between the first uniform electrode and the plurality of first electrode elements;

the second optical element is a second liquid crystal element that includes a second uniform electrode, a plurality of second electrode elements arrayed in the second direction, and a second liquid crystal layer disposed between the second uniform electrode and the plurality of second electrode elements; and the optical element driving circuit is a liquid crystal driving circuit.

13. The optical pickup of claim 4, wherein:
the first optical element is a first liquid crystal element that includes a first uniform electrode, a plurality of mutually parallel strip-shaped first electrode elements arrayed in the first direction, and a first liquid crystal layer disposed between the first uniform electrode and the plurality of the first electrode elements;

the second optical element is a second liquid crystal element that includes a second uniform electrode, a plurality of concentric annular second electrode elements, and a second liquid crystal layer disposed between the second uniform electrode and the plurality of second electrode elements; and the optical element driving circuit is a liquid crystal driving circuit.

14. The optical pickup of claim 1, further comprising:
a media discriminator for determining the type of the optical disc from the at least one photodetection signal output from the photodetector; and a control signal detection circuit for generating at least a focus error signal from the at least one photodetection signal output from the photodetector; wherein the optical element driving circuit varies the lens functions of the first and second optical elements according to the decision signal output from the media discriminator so that a range of linearity of a relationship between focusing error of the laser beams and the focusing error signal has a value preset for the type of the optical disc, a number of signal surfaces in the optical disc, or a spacing between the signal surfaces in the optical disc.

15. The optical pickup of claim 1, further comprising:
a media discriminator for determining the type of the optical disc from the at least one photodetection signal output from the photodetector; and a control signal detection circuit for generating at least a focus error signal from the at least one photodetection signal output from the photodetector; wherein the optical element driving circuit varies the lens functions of the first and second optical elements according to the decision signal output from the media discriminator so that a range of linearity of a relationship between focusing error of the laser beams and the focusing error signal falls within a range defined for the type of the optical disc according to an optical disc specification.

16. The optical pickup of claim 1, wherein:
said at least two laser beams with different wavelengths are two laser beams with different wavelengths; and said different wavelengths are two wavelengths, each center wavelength of which is selected from a group consisting of three wavelengths of 0.405 μm, 0.65 μm, and 0.78 μM.

17. The optical pickup of claim 1, wherein:
said at least two laser beams with different wavelengths are three or more laser beams with different wavelengths; and said three or more laser beams with different wavelengths include a first laser beam with a center wavelength of 0.405 μm, a second laser beam with a center wavelength of 0.65 μm, and a third laser beam with a center wavelength of 0.78 μm.

* * * * *